United States Patent

Cook et al.

[11] Patent Number: 5,925,181
[45] Date of Patent: *Jul. 20, 1999

[54] PH-SENSITIVE MODIFIED CELLULOSE ESTER

[76] Inventors: Phillip Michael Cook, 231 Saddle Ridge Dr., Kingsport, Tenn. 37664-4780; Juanelle Little Lambert, 214 Picadilly La., Gray, Tenn. 37615-3232

[*] Notice: This patent issued on a continued prosecution application filed under 37 CFR 1.53(d), and is subject to the twenty year patent term provisions of 35 U.S.C. 154(a)(2).

[21] Appl. No.: 08/819,932

[22] Filed: Mar. 18, 1997

Related U.S. Application Data

[60] Provisional application No. 60/015,013, Apr. 8, 1996, abandoned.

[51] Int. Cl.⁶ .................. C09D 101/14; A01N 25/10; B01J 32/00; C11D 3/395
[52] U.S. Cl. .................. 106/170.29; 106/170.27; 502/439; 504/116; 514/731; 510/302; 510/303; 510/379; 510/380; 510/381; 510/471; 510/473
[58] Field of Search .................. 106/170.29, 170.27; 502/439; 504/116; 514/731; 510/302, 303, 379, 380, 381, 471, 473

[56] References Cited

U.S. PATENT DOCUMENTS

| | | | |
|---|---|---|---|
| 3,489,743 | 1/1970 | Crans | 260/225 |
| 3,505,312 | 4/1970 | Malm et al. | 260/225 |
| 3,908,045 | 9/1975 | Alterman et al. | |
| 3,944,497 | 3/1976 | Alterman et al. | |
| 3,983,254 | 9/1976 | Alterman et al. | |
| 4,078,099 | 3/1978 | Mazzola. | |
| 4,124,734 | 11/1978 | Alterman et al. | |
| 4,126,717 | 11/1978 | Mazzola. | |
| 4,136,052 | 1/1979 | Mazzola. | |
| 4,762,637 | 8/1988 | Aronson et al. | |
| 5,000,869 | 3/1991 | Dittert. | |
| 5,292,783 | 3/1994 | Buchanan et al. | |
| 5,356,634 | 10/1994 | Wu et al. | 424/464 |
| 5,446,079 | 8/1995 | Buchanan et al. | |
| 5,521,304 | 5/1996 | Edgar et al. | |
| 5,559,171 | 9/1996 | Buchanan et al. | |
| 5,580,911 | 12/1996 | Buchanan et al. | |

OTHER PUBLICATIONS

Indian Journal of Pharmaceutical Sciences, vol. 49, No. 1, (1987) pp. 1–4, XP000617988, R.S.R. Murthy et al.: Synthesis and Evaluation of Cellulose Acetate Maelate as an Enteric Coating.

CA 125:143490, Kawamoto et al, "Silver Halide . . . " May 1986.

*Primary Examiner*—David Brunsman
*Attorney, Agent, or Firm*—Andrew B. Griffis; Harry J. Gwinnell

[57] ABSTRACT

Cellulose esters according to formula (I):

$$[(C_6H_7O_2)(OR)_x(OR')_y(OH)_{3-x-y}]_n \quad (I)$$

are described, where R is hydrophobic, R' is hydrophilic and not phthalyl or trimellityl, which may be designed, by the proper selection of R, R', x, y, and n, to dissolve under mild to alkaline conditions, and not before. A coating comprising a modified ester according to formula (I) may be used for controlled-release applications, particularly for a cleaning formulation.

6 Claims, No Drawings

PH-SENSITIVE MODIFIED CELLULOSE ESTER

CROSS REFERENCE TO RELATED APPLICATION

This Application claims the benefit of Provisional application Ser. No. 60/015,013, filed Apr. 8, 1996.

FIELD OF THE INVENTION

The present invention is directed to cellulose esters with pH-sensitive solubility. These modified cellulose esters are especially useful in coating applications to protect a coated material in controlled-release applications.

BACKGROUND OF THE INVENTION

Cellulose, $(C_6H_{10}O_5)_n$ or $[(C_6H_7O_2)(OH)_3]_n$, is a readily available, naturally occurring polymer, comprising anhydroglucose units joined by an oxygen linkage to form long molecular chains. Modified cellulose, formed by substitution of appropriate radicals for the hydroxyl groups on the cellulose backbone, are well known. In particular, cellulose esters are widely used in applications such as coatings, pharmaceutical, and plastics. Modified cellulose material tends to be more environmentally compatible than other types of polymers, e.g., some cellulose esters have been shown to be biodegradable. See, for instance, Edgar et al., U.S. Pat. No. 5,521,304, and Buchanan et al., U.S. Pat. Nos. 5,580,911, 5,559,171, 5,446,079, and 5,292,783.

It is often desirable to protect active agents, such as cleaning agents (e.g., bleaches), medicaments, pesticides (e.g., insecticides) and herbicides, catalysts, colorants (e.g., inks and pigments) and the like, from their surrounding environment (or vice versa, i.e., to protect the environment from the active agent). For instance, it may be desirable to prevent bleaching agents from acting on fabric until the fabric is totally immersed in water, or to prevent medicaments from acting until they have reached a certain location in the body.

In particular, although the present invention is not so limited, various efforts have been made in the past to incorporate cleaning agents into a film-forming or matrix material that dissolves at an appropriate time to release the cleaning agent. Encapsulation of chlorine-containing bleaching agents with pH-sensitive coatings from non-aqueous solutions of fatty acids is described by Alterman et al. in U.S. Pat. Nos. 3,908,045, 3,944,497, 3,983,254, and 4,124,734. Likewise, Mazzola describes, in U.S. Pat. Nos. 4,078,099, 4,126,717, and 4,136,052, the use of molten fatty acid-containing coatings. Such fatty acids, oils, and waxes are unsuitable for many cleaning applications because they tend to contribute heavily to enhanced foaming and tend to leave a residue on the cleaned surface.

U.S. Pat. No. 4,762,637 (Aronson et al.) teaches the use of pH-sensitive coatings of copolymers from carboxylic acids, carboxylic anhydrides, alkyl partial esters thereof, and their salt derivatives. These materials are unsuitable for many applications, due to their tendency to persist in the environment.

U.S. Pat. No. 5,000,869 (Dittert) describes the use of so-called enteric polymers such as cellulose acetate phthalate, hydroxypropyl methylcellulose phthalate, and polyvinyl acetate phthalate for encapsulation of tetrachloroglycoluril, a bleaching and cleaning agent previously commercially available from Diamond Shamrock. These coatings are said to dissolve under mild (near-neutral), to alkaline conditions. However, phthalated enteric polymers, such as cellulose acetate phthalate, can break down to yield free phthalic acid when stored in contact with moisture. In doing so, their pH-sensitivity is diminished or lost, and in some cases, the polymer becomes totally insoluble in aqueous buffer.

Encapsulated or matrix-containing medicaments are also well-known. pH-sensitive cellulose-based polymers having pendant carboxyl groups such as cellulose acetate phthalate, cellulose acetate trimellitate, and hydroxypropyl methylcellulose phthalate are well known throughout the pharmaceutical industry as enteric polymers. They are used to encapsulate medicaments that are either destroyed on exposure to strong acid conditions found in the stomach (pH<3) or to protect the stomach itself from the medicament, such as aspirin. As the coated medicament leaves the stomach and enters the small intestine, the pH increases to above about 5, whereupon the pendant carboxyl groups begin to ionize, and the coating begins to dissolve, releasing the medicament. In addition to the aforementioned problems associated with phthalated cellulose esters, however, the trimellitic moiety also tends to be unstable. Thus, neither the phthalate nor the trimellitic cellulose esters are desirable when long term storage (>2 years) stability is desired.

Use of such enteric polymers as encapsulating agents for solid chlorine-containing bleach components in cleaning formulations, especially laundry detergent, is highly unsuitable because such coatings are very water-sensitive and dissolve at a relatively low pH. This means that if the coated bleach particles are packaged in direct contact with laundry detergent, the presence of incidental moisture will result in a localized increase in pH, because alkali such as sodium carbonate or sodium silicate begins to dissolve on contact with water. As the pH increases, the enteric coating begins to dissolve prematurely, exposing the bleaching agent. If the bleach particles and detergent are in contact with fabric, localized bleaching or pin holing will result.

In this regard, premature bleach release could be minimized if coatings are used for encapsulation that will only dissolve at, for instance, pH>9, and not before. As more alkalinity (higher pH) is needed to dissolve the coating, greater protection of the bleach particles would be afforded by providing a strong alkaline buffering capacity; that is to say, more than incidental wetting will be needed to dissolve sufficient alkali in the detergent to raise the pH and cause the coating to dissolve. Thus the fabric will be protected from the bleach particle until a copious amount of water is present and the bleach particles are evenly dispersed in the liquid.

SUMMARY OF THE INVENTION

The present inventors have surprisingly discovered that in cellulose esters having at least two different ester groups attached to the cellulose backbone, one group being relatively hydrophobic and the other group being relatively hydrophilic, by varying the ratio of the hydrophobic group to the hydrophilic group, as well as by varying the nature of the hydrophobic and hydrophilic pendant groups attached to the cellulose backbone, the pH of dissolution of the cellulose esters can be made to dissolve at any pH between about 6.5 and about 10, and not before.

Thus, an object of the invention is to describe pH-sensitive cellulose esters useful for a wide variety of applications where dissolution between from near-neutral to alkaline conditions is desired.

Another object of the invention is to describe novel film-forming and matrix-forming material for formulations including active ingredients such as cleaning agents, medicaments, pesticides, catalysts, colorants, and the like.

A further object of the invention is to describe the preparation and isolation of pH-sensitive cellulose esters that can be designed to dissolve at any desired pH between about 6.5 and about 10 (i.e., "dial-in dissolution").

Yet another object of the invention is to describe a coated composition comprising modified cellulose esters and an active agent, and in particular the use of such cellulose esters to encapsulate solid chlorine-containing bleach particles for use in a variety of cleaning applications.

A still further object of the invention is to describe aqueous solutions having a pH of from mild to basic and having modified cellulose esters dissolved therein.

These and other objects, features, and advantages will become apparent as reference is made to the following detailed description, preferred embodiments, and specific examples.

DETAILED DESCRIPTION OF THE INVENTION

Cellulose esters according to the present invention have the formula (I):

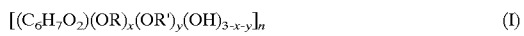

$$[(C_6H_7O_2)(OR)_x(OR')_y(OH)_{3-x-y}]_n \qquad (I)$$

wherein R is relatively hydrophobic and R' is relatively hydrophilic. By varying the identity of R and/or R' and by varying the ratio of R:R' (or the degree of substitution per anhydroglucose unit, DS/AGU, of R and/or R'), the pH of dissolution of the cellulose ester may be varied. Within the scope of the present invention, the variation is such that a modified cellulose ester will dissolve in an aqueous solution at some point above pH=6.5, and not before.

R is hydrophobic (relative to R'), and is preferably a $C_2$–$C_4$ acyl-containing group, e.g., R is derived from a $C_2$–$C_4$ monocarboxylic acid. More preferably, R represents acetyl, propionyl, or butyryl (e.g., OR is acetate, propionate, or butyrate). Most preferably, R is acetyl. For the purpose of ready dissolution, it is preferred that the R moiety be the same on each anhydroglucose unit and within the polymer, since it has been found that the polymer tends to swell rather than dissolve in cases where there is a mixture of aliphatic, monocarboxylic hydrophobic groups.

R' is hydrophilic (relative to R), and contains pendant groups that are hydrophilic. R' is preferably derived from molecules that, when attached to the cellulose backbone, have free carboxylic acid pendant groups, but R' is not phthalyl or trimellityl. R' preferably contains an acyl radical group and a carboxyl pendant group. Thus, R' is preferably derived from dicarboxylic acids, e.g., maleic acid, more preferably aliphatic dicarboxylic acids. R' may be straight chain or branched, may contain cyclic groups (heterocyclic or non-heterocyclic). R' is not particularly limited by molecular weight, other than by the aforementioned object of the invention that dissolution occur about at or near neutral conditions to alkaline conditions, and not before.

For the purposes of ready dissolution at a pH above about 6.5 and within the preferred limits of x, y, and n as herein described, R' typically is $C_2$–$C_{20}$, more preferably $C_2$–$C_{10}$, and even more preferably $C_3$–$C_9$, acyl-containing aliphatic group having at least one pendant free carboxyl group.

By "ready dissolution" is meant that a cellulose ester dissolves at a given "dialed-in" pH within a time period effective for the purpose for which it is used. In addition to varying the aforementioned parameters x, y, n, R, and R', the thickness of the coating may be adjusted to change the time of dissolution at a pH at which the modified cellulose ester according to the present invention is soluble. A skilled artisan in possession of the present disclosure would be well-aware of how to adjust the thickness of a coating comprising a modified cellulose ester according to the present invention.

Of course it is to be understood that R' can be variously substituted (e.g., with N-, O-, or S-containing moieties) to make it more or less hydrophilic.

For the preferred embodiments, the invention can be practiced using a large variety of carboxyl-containing pendant groups and mixtures thereof for R'. These include, but are not limited to $C_2$–$C_{20}$, more preferably $C_2$–$C_{10}$, even more preferably $C_3$–$C_9$, acyl groups containing at least one pendant free carboxyl group. In the more preferred case wherein the acyl group is aliphatic, OR' may be maleate, succinate, glutarate, hexahydrophthalate (i.e., 1,2-cyclohexane dicarboxylic), tetrahydrophthalic, or a mixture thereof.

R' may be a mixture of hydrophilic groups within each anhydroglucose unit and/or along the polymer chain. R' is more preferably selected from succinyl, hexahydrophthalyl, or a mixture thereof. Even more preferably, R' is hexahydrophthalyl. Most preferably, for the purpose of use in a cleaning composition, the cellulose ester according to the present invention has acetyl as the hydrophobic moiety and hexahydrophthalyl as the hydrophilic moiety.

The degree of substitution per anhydroglucose unit (DS/AGU) for the esters is represented by x and y. Of course it is to be understood that x and y represent the average degree of substitution over the entire polymer. According to the present invention, in order to get "dial-in" pH-sensitive dissolution between about pH=6.5 and about pH=10, and not before, x is preferably 1.0–2.5, more preferably 1.2–2.2, even more preferably 1.8–2.2, and y is preferably 0.1–2.0, more preferably 0.2–1.0, and even more preferably 0.4–1.0. The cellulose backbone is preferably not completely esterified, and the amount of hydroxyl moieties is calculated from (3-x-y).

The mole ratio of R':R (expressed using DS/AGU) thus ranges from 1.0:2.0 to 2.5:0.1. More preferably, R':R ranges from 1.2:1.0 to 2.2:0.2.

The total degree of substitution (x+y) is preferably about 1.1 to less than 3.0, more preferably about 1.4 to less than 3.0, even more preferably about 2.2 to less than 3.0

The degree of polymerization (DP), represented by n, may be higher or lower than that for naturally occurring cellulose (e.g., 1000 for wood pulp to 3500 for cotton fiber), but for the pH-sensitivity according to the present invention and for ready dissolution, n is preferably 30–400, more preferably 50–200, and most preferably 50–150. In general, when n<30, it has been found to be difficult to form a film, whereas when n>400, the cellulose mixed ester becomes more difficult to process.

By varying the exact identity of the hydrophobic R and the hydrophilic R' (e.g., chain length or branching, and substitution) and their degree of substitution (x and/or y), and/or by varying n, the pH at which a cellulose ester according to the present invention dissolves can be "dialed-in". Thus, a cellulose ester according to the present invention can be made to dissolve at, and not below, about pH=6.5, about pH=7.0, about pH=8.0, about pH=9.0, about 10.0, or, in other words, about at or above any tenth of a pH unit above 6.5. Therefore, it is to be understood that the scope of the present invention includes modified cellulose esters according to formula (I) that dissolve at, and not before, pH=6.6, . . . , 6.9, 7.0, 7.1, . . . , 7.5, 8.5, 9.5 . . . , 10.1, . . . , etc.

The aqueous solutions in which the modified cellulose ester according to the present invention are soluble in include water with any aqueous base, i.e., alkali metal hydroxides (e.g., NaOH), ammonia, amines, or buffers such as a phosphate buffer. Such aqueous bases and/or buffers are per se well-known in the art.

As used herein, the term "cellulose ester" shall mean an unmodified cellulose ester useful as a starting material for preparing the cellulose esters according to the present invention, and the term "modified cellulose ester" shall mean the cellulose ester according to the present invention.

PREPARATION OF THE MODIFIED CELLULOSE ESTERS

In the process for preparing the modified cellulose ester, it is preferred that the cellulose ester starting material has a degree of substitution (DS) per anhydroglucose unit of residual hydroxyl groups of about 1.0 to about 2.0.

The cellulose ester starting materials may be of the acetate, propionate, or butyrate type, or mixed esters thereof, with acetate being the most preferred. The degree of substitution per anhydroglucose unit of residual hydroxyl groups for these cellulose esters is 0.1 to about 2.0 with about 1.0 to about 2.0 being the preferred range. The starting materials are all commercially available and/or may be prepared by methods well-known to the artisan. Typical starting cellulose esters include, but are not limited to: cellulose acetate esters such as CA 150, CA 320, CA 398; cellulose acetate propionate esters, such as CAP 482, CAP 504; and cellulose acetate butyrate esters such as CAB 381, CAB 383, and CAB 553, all commercially available from Eastman Chemical Company, Kingsport, Tenn. Such cellulose ester starting materials typically have a number average molecular weight of between about 10,000 and about 75,000 Daltons as determined by gel permeation chromatography using polystyrene standards.

The molar proportions of starting materials used in the manufacturing process of the present invention are those proportions sufficient to result in the desired degree of substitution of the modified cellulose ester to achieve the desired product and may be readily determined by one of skill in the art in possession of the present disclosure.

Suitable solvents for preparing the modified cellulose ester of the present invention include, but are not limited to: ketones, ester, aliphatic monocarboxylic acids, and chlorinated hydrocarbons. Specific examples include, but are not limited to: acetone, 2-butanone, ethyl acetate, propyl acetate, chlorobenzene, methylene chloride, chloroform, acetic acid and propionic acid. Reactions are typically carried out in about 40 to about 90 weight % solvent solutions based upon the weight of the cellulose ester starting material. Determination of the proper solvent can be readily determined by one of skill in possession of the present disclosure.

Suitable catalysts useful for preparation of the modified cellulose esters in the present invention include, but are not limited to: amines such as triethylamine, tributylamine, diisopropylamine, and pyridine; alkali metal salts of aliphatic carboxylic such as sodium acetate, potassium acetate, calcium acetate, sodium propionate and potassium propionate; and alkali metal carbonate salts such as sodium carbonate and potassium carbonate. A typical catalyst concentration used is about 25 to about 100 weight % based on the weight of the starting cellulose ester. Again, the identity and amount of the catalyst may be determined by one of skill in the art in possession of the present disclosure.

In the synthesis of a modified cellulose ester according to the present invention, the reaction is performed under conditions such that the desired modified cellulose ester is formed. Typically the reaction period is about 1 to about 12 hours, preferably about 2 to about 5 hours. The temperature during the reaction is typically about 50° to about 120° C., preferably about 60° to about 80° C.

In a process according to the present invention, the following sequential steps are preferred:

1. An appropriate cellulose ester starting material is dissolved in a suitable solvent such as reagent grade acetic acid to obtain a solvent solution.
2. The reaction mixture is heated to about 65° C.
3. The aliphatic anhydride of the hydrophilic ester (R') is then added and agitated until dissolved.
4. Sodium acetate is added.
5. The reaction mixture is heated at about 75° C. for approximately 3 hours.

In the process of the invention, for facilitating isolation of the modified cellulose ester, a nonsolvent is added to the aforementioned reaction mixture. The nonsolvent is a liquid in which the modified cellulose ester is not soluble. Such nonsolvents include but are not limited to: water, isopropyl alcohol, hexane, heptane, and mixtures thereof. The amount of nonsolvent used in the process to precipitate the modified cellulose ester is about 25 to about 100 weight % of nonsolvent based on the total weight of the reaction mixture. It is preferred that such process includes the additional step of separating the precipitated modified cellulose ester from unprecipitated reaction by-products. Unprecipitated by-products, typically include an aliphatic acid derived from hydrolysis of the aliphatic anhydride, the sodium salt of the aliphatic acid, reaction catalyst, and mixtures thereof.

In a preferred process for isolating and/facilitating isolating the modified cellulose ester, after Step 5 above, the following sequential steps are followed:

6. The reaction mixture is cooled to 50° C. and drowned into water with rapid agitation to precipitate the modified cellulose ester.
7. The modified cellulose ester product is filtered and washed with water to remove unprecipitated reaction by-products. Also, the drowning, filtering, and drying steps may be repeated to further purify the desired product.
8. The water-wet modified cellulose ester is dried at 60° C. in a vacuum oven.

SPECIFIC EXAMPLES OF PREPARATION

The following examples are meant to illustrate the present invention. Numerous modifications and variations are possible, and it is to be understood that within the scope of the appended claims, the invention may be practiced otherwise than as specifically described herein.

Example 1

Preparation of CA 320-succinate

In a 5-gallon sigma blade mixer are placed 7300 g reagent grade acetic acid and 2500 g of CA 320 with hydroxyl content of 8.4% by weight, commercially available from Eastman Chemical Company, Kingsport, Tenn. The reaction mixture is heated to 65° C. and agitated until all the cellulose ester dissolves. Then 600 g of succinic anhydride is added and agitated at 65° C. until a clear solution is obtained, after which 1250 g of anhydrous sodium acetate is added. The reaction mixture is heated at 75° C. for 3 hours and then cooled to 50° C., where upon it is drowned into 9000 g of water with high speed agitation to precipitate the modified cellulose ester product. The precipitated cellulose ester is collected by filtration and then washed with 15,000 g of water. The water-wet modified cellulose ester product is then dried in a vacuum oven at 60° C. to a moisture content of less than 2%. Analyses by titration and nuclear magnetic resonance showed the degree of substitution per anhydroglucose unit for acetate and succinate to be 1.81 and 0.42, respectively. This is Sample 2 in Table 1 below.

Example 2

Preparation of CA 320-hexahydrophthalate (cyclohexane 1,2-dicarboxylic acid)

In a 5-gallon sigma blade mixer are placed 7300 g reagent grade acetic acid and 2500 g of CA 320 having 8.4% hydroxyl content by weight, commercially available from Eastman Chemical Company, Kingsport, Tenn. The reaction mixture is heated to 65° C. and agitated until all the cellulose ester dissolves. Then 900 g of hexahydrophthalic anhydride (cyclohexane 1,2-dicarboxylic anhydride) is added and agitated at 65° C. until a clear solution is obtained, after which 1250 g of anhydrous sodium acetate is added. The reaction mixture is heated at 75° C. for 3 hours and then cooled to 50° C., where upon it is drowned into 9000 g of water with high sped agitation to precipitate the modified cellulose ester product. The precipitated cellulose ester product is collected by filtration and then washed with 15,000 g of water. The water-wet modified cellulose ester is then dried in a vacuum oven at 60° C. to a moisture content of less than 2%. Analysis by titration and nuclear magnetic resonance showed the degree of substitution per anhydroglucose unit for acetate and phthalate to be 1.84, and 0.41, respectively. This is Sample 14 in Table 1 below.

Additional modified cellulose esters according to the present invention and having the degree of substitution shown in Table 1, below, were prepared and analyzed in a like manner

TABLE 1

| Sample No. | DS Acetyl | DS Succinyl | DS 1,2-CHDA[1] |
|---|---|---|---|
| 1 | 1.83 | 0.26 | |
| 2 | 1.81 | 0.42 | |
| 3 | 1.80 | 0.52 | |
| 4 | 1.82 | 1.05 | |
| 5 | 2.01 | 0.45 | |
| 6 | 2.02 | 0.69 | |
| 7 | 2.02 | 0.91 | |
| 8 | 2.07 | 0.38 | |
| 9 | 2.08 | 0.59 | |
| 10 | 2.08 | 0.76 | |
| 11 | 1.66 | | 0.12 |
| 12 | 1.62 | | 0.52 |
| 13 | 1.67 | | 0.93 |
| 14 | 1.84 | | 0.41 |
| 15 | 1.82 | | 0.78 |
| 16 | 1.90 | | 0.87 |
| 17 | 1.91 | | 1.08 |
| 18 | 2.18 | | 0.68 |
| 19 | 2.17 | | 0.82 |

[1]Cyclohexane 1,2-dicarboxylic acid

Free film dissolution of modified cellulose esters in aqueous pH buffer solutions Samples of each modified cellulose ester shown in Table 1 was dissolved in acetone to form clear solutions. A film from each solution was cast on a glass plate using a doctor blade. The dried film was removed, cut into pieces, and each piece of film was put into vials containing aqueous buffered solutions ranging in pH from 6.9 to 10.1. The data is given in Tables 2–3, below, for cellulose acetate succinate, cellulose acetate hexahydrophthalate (cyclohexane 1,2-dicarboxylate), respectively. Note that for the purposes of Tables 2–3 that follow, "soluble" is defined as dissolution of one part by weight of test material in 99 parts by weight of solvent, which, in the examples below, is an aqueous buffer.

With reference to Table 1, Tables 2–3 show that the pH at which a modified cellulose ester according to formula (I) will dissolve may be varied simply by varying R, R', x and y in formula (I).

TABLE 2

Solubility of Cellulose Acetate Succinate in Aqueous pH Buffers[1]

| DS Acetyl (NMR) | 1.83 | 1.81 | 1.80 | 1.82 | 2.01 | 2.02 | 2.02 | 2.07 | 2.08 | 2.08 |
|---|---|---|---|---|---|---|---|---|---|---|
| DS Succinate (NMR) | 0.26 | 0.42 | 0.52 | 1.05 | 0.45 | 0.69 | 0.91 | 0.38 | 0.59 | 0.76 |
| DS OH (Calc.) | 0.91 | 0.77 | 0.68 | 0.13 | 0.54 | 0.29 | 0.07 | 0.55 | 0.33 | 0.16 |
| Buffer pH | | | | | | | | | | |
| 6.9 | I | I | I | S | | I | I | | I | I |
| 7.0 | | | | | I | | I | I | I | |
| 8.2 | I | I | S | S | I | I | | I | | I |
| 8.4 | | | | | | | I | | I | |
| 8.5 | I | S | S | | | S | | | | S |
| 8.7 | | | | S | I | | | I | | |
| 9.0 | | | | | | | S | | | S |
| 9.2 | I | S | S | S | I | | | I | | S |
| 9.5 | | | | | | S | S | | S | |
| 9.8 | I | S | S | S | | | | | | S |
| 9.9 | | | | | I | | | I | | |
| 10.1 | | | | | | S | S | | S | |

[1]I = Insoluble; S = Soluble

TABLE 3

Solubility of Cellulose Acetate Hexahydrophthalate in Aqueous PH Buffers[1]

| DS Acetyl (NMR) | 1.66 | 1.62 | 1.67 | 1.84 | 1.82 | 1.82 | 1.09 | 1.91 | 2.18 | 2.17 |
|---|---|---|---|---|---|---|---|---|---|---|
| DS CHDA (NMR) | 0.2117 | 0.52 | 0.93 | 0.41 | 0.78 | 0.91 | 0.87 | 1.08 | 0.68 | 0.82 |
| DS Hydroxyl (Calc.) | 1.13 | 0.86 | 0.41 | 0.75 | 0.40 | 0.27 | 0.22 | 0.01 | 0.14 | 0.01 |
| Buffer pH | | | | | | | | | | |
| 6.5 | I | I | I | | | | | | | |
| 6.7 | I | I | I | I | I | I | I | | | I |
| 6.9 | I | I | I | | | | | I | I | |
| 7.2 | | I | | | | | | | | |
| 7.6 | | | | | | | | I | | |
| 7.9 | | | | I | I | I | I | | | I |
| 8.1 | | S | | | | | | | | |
| 8.2 | I | | | | | | | | | |
| 8.5 | | | | S | S | S | I | | I | I |
| 8.6 | | S | | | | | | I | | |
| 8.7 | | S | | S | S | S | S | | I | I |
| 9.2 | | | S | | | | | S | | |
| 9.4 | | | | S | S | S | S | | | S |
| 9.8 | I | | | | | | | S | I | |
| 10.1 | | S | S | S | S | | S | | | |

[1] I = Insoluble; S = Soluble

Coating Composition

The modified cellulose esters may be used in a wide variety of applications, particularly coating applications and more particularly as a film-forming composition useful as a coating. As used herein, the term "coating" includes encapsulation or a matrix formulation.

A particular active ingredient, such as a cleaning agent, medicament, pesticide or insecticide, may be encapsulated. As used herein, the term "encapsulated" means that the active agent (e.g., cleaning agent, medicament, etc.) is enveloped as a discrete entity (e.g., as a particle) by the modified cellulose ester, or the active ingredients are dispersed within a matrix of the modified cellulose ester.

More than one active agent may be encapsulated at the same time. In addition, more than one coating may be used, e.g., two coating may be used having differing pH-sensitivities. A coating within the scope of the present invention may also comprise a coating material that does not dissolve within the pH range of the modified cellulose esters, e.g., the coating may be one of the enteric coating previously described. Thus, a coated substrate may have a first coating of a modified cellulose ester according to the present invention, and a second coating of an enteric polymer, or a first coating of an enteric polymer and a second coating of a modified cellulose ester according to the present invention. The modified cellulose ester may also be mixed with, for instance, an enteric coating, to comprise a single coating composition having a still further modified pH-sensitivity.

In a preferred embodiment of the present invention, the modified cellulose ester is used as a coating in cleaning applications, more preferably in laundry cleaning compositions. In a more preferred embodiment, the modified cellulose esters are used to encapsulate bleaching agents, particularly reactive halogen-containing oxidizing agents. However, a cleaning composition according to this preferred embodiment of the present invention may be any variety, such as for the household or for commercial cleaning, and for any purpose, such as for fabrics or hard surfaces.

A wide range of commonly used reactive halogen-containing oxidizing agents can be coated with the modified cellulose esters of the present invention. A "reactive halogen-containing oxidizing agent" is one in which the bond is hydrolyzed in water to yield either free chlorine or alkaline hypochlorite. These oxidizing agents include, but are not limited to: the heterocyclic N-chloro and N-bromo imides of cyanuric acids, glycolurils, and hydantoins, and alkali metal salts of hypochlorite. Oxidizing agents per se are well-known in the art.

In a preferred embodiment, included in the coating composition is a plasticizer in the amount of 1–50% by weight of the modified cellulose ester. Examples of such plasticizers include but are not limited to: triethyl citrate, diethyl phthalate, dibutyl phthalate, and triacetin. Plasticizers per se are well-known in the art.

In a preferred embodiment, with or without the plasticizers referred to above, the coating composition may contain other formulation additives that contribute to the non-volatile content of the composition. Such additives include, for example, leveling agents, antifoamants, and the like. These additives are per se well-known in the art. Such additives may be present, in a more preferred embodiment, in an amount from about 0.1 to about 5 weight % of total coating composition, still more preferably about 0.1 to about 1.0 weight %.

In preparing the coated composition according to the present invention, a suitable solvent must be used. The suitable solvent must be one in which the modified cellulose ester is soluble and inert. Aliphatic hydrocarbons are not suitable for this purpose since the modified cellulose esters do not dissolve in them. Typical examples of such suitable solvents for a composition comprising the modified cellulose esters and a reactive halogen-containing oxidizing agent include, but are not limited to: ketones, esters, chlorinated hydrocarbons, aqueous buffer solutions, and mixtures thereof. Specific examples include, but are not limited to: cyclohexanone, 3-pentanone, ethyl acetate, propyl acetate, butyl acetate, methylene chloride, chloroform, and aqueous buffered solutions. The skilled artisan, in possession of the present disclosure, can readily determine the appropriate solvent.

Likewise, the amount of suitable solvent in a coating composition according to the present invention is that amount sufficient to dissolve the modified cellulose ester. Typically, this amount is about 60 to about 90 weight % of the total coating composition, preferably about 65 to about 75 weight %. It is contemplated that mixtures of solvents can be used in the coatings (and process) of the present invention.

Many processes are known in the art for applying uniform coatings on particles. To this end, see for instance "Microencapsulation and Related Processes" by Patrick B. Deasy, published by Marcel Dekker, N.Y., N.Y. (1984); "The Theory and Practice of Industrial Pharmacy", by Lachman et al., Lea and Febuger, Philadelphia (1970); or "Controlled-Release Technology", by K. G. Das, John Wiley & Sons, N.Y., N.Y. (1983).

Of particular importance for practicing this invention is the use of pan and fluid bed coaters. The preferred coating method is use of a Wurster coating column as described by: H. S. Hall and J. Wallace "Column and Film Coating and Processing" Controlled Release Systems: Fabrication Technology, Volume 1, pages 53–68.

Encapsulation of tetrachloroglycoluril bleach particles

Solutions of modified cellulose esters were made up at a concentration of 10 weight % in methylene chloride solvent or in water containing a stoichiometric amount of ammonia, and were used to encapsulate tetrachloroglycoluril bleach particles. The following is a typical procedure:

Into a Niro-Aeromatic STREA1 top spray coater with Wurster insert was placed 1350 grams of tetrachloroglycoluril particles. The inlet temperature was set at 60° C. The fluidizing air volume was set at 70–100 M$^3$/hour. The atomization was set at 2 bar. The pump rate was adjusted to 15 grams/min. The resulting outlet temperature was 30° C. The final coated weight of the encapsulated tetrachloroglycoluril was 1424 grams.

Fabric safety testing of encapsulated bleach using fabric pin hole test

A test swatch of blue-dyed polyester or red-dyed cotton cloth is placed into a six inch watch glass and one gram of laundry detergent is placed on top of the cloth. Water (10 ml) is added to saturate the cloth. The encapsulated tetrachloroglycoluril bleach particles (2 grams) is placed on the wet swatch of cloth and allowed to lay undisturbed for five minutes. The cloth is rinsed with tepid water and dried at ambient conditions. The cloth is visually compared to control swatches for signs of discoloration or pin holing. Test results from evaluations of two batches of encapsulated tetrachloroglycoluril bleach particles are given in Table 4 below. As shown in Table 4, a cleaning agent encapsulated by a coating comprising a modified cellulose ester according to formula (I) completely protects a substrate to be cleaned, when in the presence of incidental amounts of moisture, even in the presence of alkaline agents (e.g., a detergent).

TABLE 5

| Test Material | Effect on Red Cloth | Effect on Blue Cloth |
| --- | --- | --- |
| Tetrachloroglycoluril (TCGU) only | Discoloration | Discoloration |
| Sodium hypochlorite bleach only | Severe Discoloration | Severe Discoloration |
| Detergent only[1] | No change | No change |
| Detergent & uncoated TCGU | Discoloration | Discoloration |

TABLE 5-continued

| Test Material | Effect on Red Cloth | Effect on Blue Cloth |
| --- | --- | --- |
| Detergent & encapsulated TCGU[2] | No change | No change |
| Detergent & encapsulated TCGU[3] | No change | No change |

[1]Commercially available detergent (Tide ®) containing enzymes and without peracid bleaching system.
[2]Encapsulated TCGU using aqueous ammoniated solution of cellulose acetate cyclohexane 1,2-dicarboxylic acid (Sample 17 in Table 1).
[3]Encapsulated TCGU using solution of methylene chloride and cellulose acetate cyclohexane 1,2-dicarboxylic acid (Sample 19 in Table 1).

Evaluation of encapsulated TCGU bleach particles using Terg-o-tometer and EMPA test cloth Artificially soiled test cloth was procured from "EMPA" (Eldgenossiche Materials Prufungs Anstait) St. Gall, Switzerland (a Swiss government testing center) and was used to estimate bleaching performance of the encapsulated TCGU bleach particles. The standard cloth (12×12 cm, 200 g/m2 and designated EMPA 103) consisted of the all of the following stains:

cotton, bleached, without optical brightener (unsoiled)

cotton, EMPA standard soiling cotton, soiled with blood cotton, soiled with cocoa cotton, soiled with blood/milk/carbon black cotton, dyed with sulfur black cotton, raw cotton, soiled with red wine Samples of EMPA 103 cloth were placed in a 6-place Terg-o-tometer, Model 724ES, available from Instrument Marketing Services Company, Hoboken, N.J. The Terg-o-tometer testing conditions were as follows:

Agitation rate: 100 rpm

Cycle time: 15 minutes

Water temperature: 37° C.

Water hardness: 150 ppm

Volume: 1.0L

Detergent: 1.5 g

Bleach: NaOCl or TCGU

Cloth: EMPA 103

Rinse: rinsed by hand and dried

The results of Terg-o-tometer testing with EMPA 103 cloth are given in Table 5 below for TCGU bleach particles encapsulated with cellulose acetate cyclohexane 1,2-dicarboxylic acid (Sample 17).

The results shown in Table 5 illustrate that bleaching does occur under typical laundering conditions and illustrate that a coating comprising a modified cellulose ester according to formula (I) dissolves under alkaline conditions.

Commercially available sodium hypochlorite solution (5.25 weight %) was used as a bleach control. The detergents were commercially available. "A" in Table 5 is commercially available TIDE®, containing enzymes; "B" is commercially available TIDE® without enzymes but with a perborate bleaching agent; and "C" is commercially available XTRA®, containing neither enzymes nor peracid bleaching agents.

After the EMPA cloths were dried, the relative differences in stain removal were measured using a CAT-HS 1000 reflectometer (or colorimeter). Values are relative to the unwashed and unbleached EMPA 103 cloth. So the higher the value, the greater is the stain removal. The units for measuring degree of stain removal are dimensionless. The clothes before and after laundering are compared by measuring % reflectance using the CAT-HS100 calorimeter. The color difference designated as DE* is being measured (see ASTM standard test methods D 4265-83 and D2960-89).

TABLE 5

| | Raw Cotton | Sulfur Black | Wine | Blood Milk, Carbon Black | Cocoa | Blood | Soiling |
|---|---|---|---|---|---|---|---|
| Deterg. A | 3.10 | 1.06 | 9.53 | 25.72 | 11.61 | 22.46 | 9.37 |
| Deterg. B | 3.02 | 1.22 | 9.56 | 22.99 | 14.95 | 17.61 | 8.79 |
| Deterg. A & NaOCl[1] | 3.2 | 11.77 | 19.08 | 7.85 | 8.70 | 14.48 | 10.37 |
| Deterg. A & TCGU[2] | 3.24 | 4.47 | 14.87 | 16.17 | 4.73 | 26.95 | 15.93 |
| Deterg. C | 3.6 | 0.82 | 9.44 | 6.73 | 7.19 | 22.77 | 9.32 |
| Deterg. C & NaOCl[1] | 2.65 | 7.49 | 16.54 | 6.29 | 8.63 | 26.76 | 14.52 |
| Deterg. C & TCGU[2] | 3.57 | 12.03 | 17.88 | 6.99 | 13.50 | 19.53 | 8.14 |

[1]Concentration of NaOCl is 100 ppm
[2]Concentration of encapsulated TCGU is equivalent to 100 ppm NaOCl.

Accordingly, the present inventors have shown that a cellulose ester according to formula (I):

$$[(C_6H_7O_2)(OR)_x(OR')_y(OH)_{3-x-y}]_n \quad (I)$$

where R is preferably a $C_2$–$C_4$ acyl containing hydrophobic group (relative to R') and R' is preferably a $C_2$–$C_{10}$ acyl containing hydrophilic group (relative to R) not having the phthalic or trimellitic moieties, may be designed, by the proper selection of R, R', x, y, and n, to dissolve under mild to alkaline conditions, and not before. Furthermore, we have shown that the modified ester may be used as a coating for controlled-release applications, particularly for a cleaning formulation, that protects the environment from the coated active agent, and vice versa, until the desired conditions are reached.

The invention has been described above in detail with particular reference to preferred embodiments thereof, but it will be understood that variations and modifications other than as specifically described herein can be effected within the spirit and scope of the invention. Moreover, all patents and literature references or other publications noted above are incorporated herein by reference for any disclosure pertinent to the practice of this invention.

We claim:

1. A cleaning formulation including a coated chlorine-containing bleach particle, said coated chlorine-containing bleach particle comprising a coating comprising a cellulose ester having the formula:

$$[(C_6H_7O_2)(OR)_x(OR')_y(OH)_{3-x-y}]_n$$

where R is a $C_2$–$C_4$ acyl group, R' is a $C_2$–$C_{20}$ acyl group containing at least one pendant free carboxyl group and not including phthalyl or trimellityl, x is from about 1.0 to 2.5, y is from about 0.1 to about 2.0, and n is from about 30 to about 400;

wherein said modified cellulose ester is soluble in aqueous solution only under alkaline conditions, and not before.

2. A cleaning formulation according to claim 1, wherein R' is a $C_3$–$C_9$ acyl group.

3. A cleaning formulation according to claim 2, soluble in aqueous solution only above about pH=8.5, and not before, wherein R is acetyl, R' is selected from the group consisting of succinyl, hexahydrophthalyl, and a mixture thereof, x is from about 1.2 to about 2.2, y is from about 0.2 to about 1.0, and n is from about 50 to about 200.

4. A cleaning formulation according to claim 3, wherein R' is hexahydrophthalyl.

5. A cleaning formulation according to claim 3, soluble in aqueous solution only above about pH=9.0, and not before.

6. A cleaning formulation according to claim 3, wherein said chlorine containing bleach particle is TCGU.

* * * * *